Nov. 2, 1937.  E. D. DIAZ  2,097,656
AUTO TRANSMISSION
Filed Feb. 27, 1935    7 Sheets-Sheet 1

Nov. 2, 1937.                E. D. DIAZ                2,097,656
                          AUTO TRANSMISSION
                Filed Feb. 27, 1935        7 Sheets-Sheet 5

Nov. 2, 1937.  E. D. DIAZ  2,097,656

AUTO TRANSMISSION

Filed Feb. 27, 1935    7 Sheets-Sheet 6

Inventor
Ernesto Diaz Diaz
By
Attorney

Patented Nov. 2, 1937

2,097,656

UNITED STATES PATENT OFFICE 2,097,656

AUTO TRANSMISSION

Ernesto Diaz Diaz, Habana, Cuba

Application February 27, 1935, Serial No. 8,461

14 Claims. (Cl. 74—337)

This invention relates to transmissions for use in transmitting the power from a power shaft to a driven shaft, and particularly to an apparatus of this class involving a simple and efficient method of automatically shifting the several speeds of the transmission.

It is an object of the invention to provide an automatic transmission for motor vehicles, in which the shifting of the several speeds is controlled by the variation in speed between the power shaft and driven shaft, permitting changing of the speed gears, without the need of operating the clutch pedal.

A further object of the invention is to provide a transmission of the above-mentioned character which may be installed in the conventional motor vehicle without material alterations.

Other objects and advantages of the invention will be apparent during the course of the following description.

In the accompanying drawings, forming a part of this specification and in which like numerals are employed to designate like parts throughout the same, Fig. 1 is a side elevation view of the transmission, Fig. 27 is a cross section taken on line 27—27 of Fig. 4, Fig. 28 is a side view of the steering wheel showing the shift control lever, and, Fig. 29 is a top view of the steering wheel showing the control lever.

Figures 20, 22, 23, 24, 25:
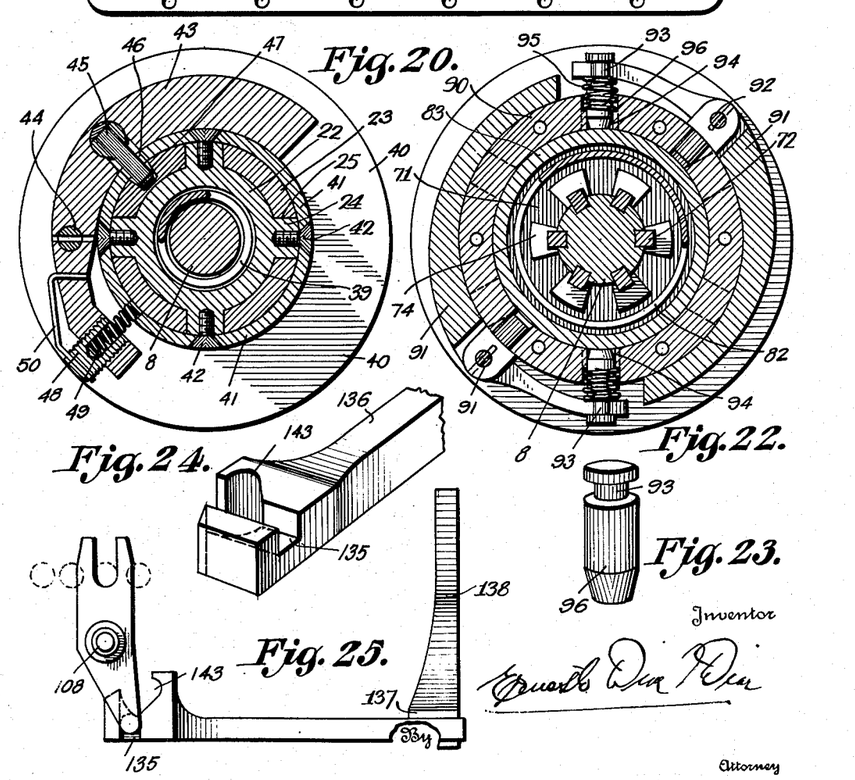
Fig. 20 is a cross section taken on line 20—20 of Fig. 5.
Fig. 22 is a cross section taken on line 22—22 of Fig. 5.
Fig. 23 is a detail view of the locking pin shown in Fig. 22.
Fig. 24 is a detail perspective view of the end of the shifting rod, shown in Fig. 16.
Fig. 25 is a top plan view of the shifting rod.

In the drawings, wherein for the purpose of illustration, I have shown a preferred embodiment of my invention, the numeral 5 denotes the drive shaft of an engine which is journaled in the bearing 6 in one end of the transmission housing 7. A driven shaft 8 is journaled in the bearing 9, at the opposite end of the housing and extends longitudinally of the housing with its inner end journaled in the bearing 10 fitted in the end of the drive shaft 5. A gear wheel 11 is formed integral with the shaft 5 which is in constant mesh with the larger gear wheel 12 fixedly mounted on the counter shaft 13 journaled in suitable bearings 14 in the ends of the housing and extending in parallel relation to the driven shaft 8. The outer casing 15 of an overrunning clutch is attached to one side of the gear wheel 11, by bolts 16 and the core 17 of the clutch is freely mounted on the driven shaft 8. The periphery of the core is provided with the usual inclined notches 18 to receive the rollers 19 which by centrifugal force are moved into gripping relation with the inner wall of the casing 15. The core 17 is provided with laterally extending spaced jaws 20, adapted to be engaged by the interfitting jaws 21 extending from the end of drum 22, freely mounted on the shaft 8, when the drum moves forward. The drum 22 fits within the enlarged end 22' of sleeve 23, freely mounted on shaft 8, and extending radially from the drum adjacent its inner end are integral lugs 24 which slidably engage in longitudinal slots 25, formed in the enlarged end of the sleeve. The outer end of the drum is formed with a shoulder 26, which supports the ring 27 having a lateral flange 28 formed with a series of cam surfaces 29, which ride against the rollers 30 journaled on bolts 31 supported by the flange 32 integral with the casing 15. The ring 27 is normally held in spaced relation to the rollers 30, by a coil spring 33 disposed between the ring and the side wall of casing 15, in surrounding relation to jaws 20 and 21. The spring 33 also serves to normally hold the jaws 21 disengaged from the jaws 20. The outer surface of flange 32 has teeth 34 milled therein which at times mesh with the interior teeth 35 of a collar 36 fitted over the annular ring 37 formed integral with the enlarged end 22' of sleeve 23 the ring 37 having peripheral teeth 38 which interfit with the teeth 35 of collar 36. The inner end of drum 22 is recessed to receive the helical spring 39 mounted on shaft 8 between the drum and the sleeve 23 which serves to move the drum longitudinally of the sleeve when the drum is released. A disk 40 surrounds the sleeve 23 and drum 22 having an angular flange 41, which connects the disk to the lugs 24 of the drum 22 by screws 42. An arcuate weighted arm 43 adjacent one end is pivotally attached to the side of the disk 40, as at 44, more clearly shown in Fig. 20. The arm carries a pin 45 adapted to pass through the opening 46 in the flange 41 and engage in a recess 47 in the sleeve 23. The pin 45 serves to hold the drum and sleeve together and prevents the drum from being moved by the action of spring 39, until the arm 43 is actuated to release the pin. The short end of the arm 43 has a stud 48 threaded therein having a recess to receive one end of a spring 49, the opposite end of the spring being seated in a recess in the flange 41, to exert a pressure on the arm 43 to hold the pin 45 engaged with the recess 47 in sleeve 23. The stud 48 is held in its adjusted position by the spring member 50. Under the action of centrifugal force the arm 43 is adapted to swing outwardly and dis-engage the pin 45 from the recess 47, thereby releasing the drum 22.

Assuming that the mechanism has been running in second speed, the gear wheel 11 together with the outer casing 15 of the over-running clutch, and the drum 22 together with the sleeve 23 have been revolving with shafts 5 and 8, but positive driving connection between the over-running clutch 15 and drum 22 has been prevented by the expansion of spring 33 and the engagement of flange 28 of ring 27 with the rollers 30 carried by the flange 32 of the casing 15. The rotation of drum 22 and sleeve 23, through the action of centrifugal force, has caused the weighted arm 43 to swing outwardly and disengage the pin 45 from the recess 47, releasing the drum 22, so that when the speed of the drive shaft 5 is reduced, which causes a corresponding reduction in the speed of the outer casing 15 of the over-running clutch, the rollers 30 will be moved around the flange 28 opposite the deep portions of the cam surfaces 29, permitting the expansion of spring 39, which is stronger than spring 33, to move the drum 22 longitudinally of the shaft 8 and engage the jaws 21 of the drum with the jaws 20 of the clutch core 17. When the speed of shaft 5 is increased direct driving connection is provided between shaft 5 and shaft 8, through the medium of the over-running clutch and the transmission is in high speed. By reason of the over-running clutch a free wheeling action is provided, as is clearly apparent.

A gear wheel 51 of the intermediate speed is freely mounted to rotate on the sleeve 23 and is in constant mesh with the gear wheel 52' keyed on the counter shaft 13, in spaced relation to the gear wheel 12. The side of the gear wheel 51 has a lateral flange 52, forming the outer casing of another over-running clutch, the core 53 of the clutch being fixed on the sleeve 23 to rotate therewith and having the usual inclined notches 18 and rollers 19, the same as the clutch core 17. The flange 52, at spaced intervals supports rollers 54, secured thereto by studs 55, and disposed upon flange 52 is an angular ring 56 having a plurality of cam surfaces 57, which contact with the rollers 54. The flange 52 and ring 56 are connected together by the link 58, which is connected at one end to one of the studs 55 of the flange 52 which moves in the longitudinal slot 58' of the link and at its opposite end to the stud 59 attached to the ring 56. An expansion spring 60 having one end connected to the stud 55 and its opposite end to the stud 59 normally maintains the ring 56 and rollers 54 in disengaged relation and the link 58 serves to limit the rotative movement of the ring when the ring 56 is rotated to cause the rollers to enter the innermost ends of the cam surfaces 57. A rotor 61 is fixed on the end of sleeve 23 in concentric relation to the ring 56 having teeth 62 milled in its periphery adapted to mesh with the interior teeth 63 of the reverse speed gear 64, slidably mounted on the rotor 61 when the reverse gear is moved forward. The exterior teeth 65 of the gear 64, mesh constantly with the idler gear 66 mounted on shaft 67, and the idler gear 66 is in mesh with the gear 68, freely mounted on the counter shaft 13. A drum 68' extends from the end of gear 64 having a series of spaced slots 69' adapted to receive the lugs 70 extending radially from the drive wheel 71 which is slidably secured on the driven shaft 8 by a series of splines 72. A helical spring 73 is mounted on the shaft 8 between the end of sleeve 23 and the wheel 71 and normally maintains the jaws 74 extending from the end of drive wheel 71, in interlocking engagement with the jaws 75 extending from the end of the clutch member 76 rotatably mounted on driven shaft 8. The clutch member 76 has a spiral jaw face 77 on its opposite end for interlocking engagement with the spiral jaw face 78 of the co-operating clutch member 79 securely fastened within the low speed gear 80, as at 81. A coil spring 82 is disposed between the wheel 71 and clutch member 76 and freely mounted on the jaw faces 77 and 78 is a drum 83 having a beveled edge 84 and upstanding flange 85 at its opposite edge. The gear 80 has a hub 86 freely mounted on the shaft 8 and is in constant mesh with the gear 87 freely mounted on the counter shaft 13. A disk 88 surrounds wheel 71 being secured to certain of the lugs 70, by screws 89. A ring 90 formed integral with drum 68' surrounds the drum 83, between the wheel 71 and flange 85 of the drum 83 and attached to opposite sides of the ring are weighted arcuate arms 91, pivotally mounted intermediate their ends, as at 92. The short ends of the arms 91 are connected to pins 93 which are disposed in openings 94 through the ring 90. A spring 95 mounted on the pins between the arm and shoulder 96 formed in the openings 94, normally holds the pins out of engagement with the drum 83, but under centrifugal force the weighted arms 91 depress the pins 93 and when the ring 90 is moved forward by the spring 97 mounted on the drum between the ring and flange 85, the pins are moved into engagement with the beveled edge 84 of the drum, holding the jaws 74 and 75 in separate relation. A washer 98 is fitted over the shaft 8 against the gear 80 and is attached to the inner core of the ball bearing 9.

When the power is imparted to the gear 80 through the gear 87, the gear 80 rotates the clutch members 76 and 78, which are in interlocking engagement and the clutch member 76 in turn rotates the drive wheel 71 by reason of its connection therewith through the jaws 74 and 75. The drive wheel 71 being splined on the driven shaft 8 rotates the driven shaft and the transmission is in low gear speed. While in low gear the drive wheel 71 through its lugs 70 which engage in the slots 69 of the drum 68' rotates the drum which has associated therewith the ring 90 and gear 64, but connection between the gear 64 and rotor 61 is not established by reason of the tension of spring 73. However the gear 51 is in mesh with gear 52' keyed on the counter-shaft 13 and is rotated thereby. When the speed of the drive shaft is reduced there is a corresponding reduction in the speed of the counter-shaft and gears 52' and 87, consequently resulting in a reduction of the speed of gears 51 and 80. The momentum of the vehicle keeps the driven shaft 8 revolving at a higher speed and all the parts connected therewith. This variance between the speed of the driven shaft 8 and gear 80 causes the jaw faces 77 and 78 to move apart disconnecting the clutch members 76 and 79. This separation of the clutch members moves the drive wheel 71 longitudinally of the driven shaft and compresses the spring 73 at the same time permitting the spring 97 to distend and push the drum 68' against the ring 56 and through frictional contact between the drum 68' and ring 56, the ring is caused to turn until the rollers 54 are engaged in the innermost ends of the cam surfaces 57 of the ring which permits the ring to move towards the gear 51 and allow the teeth 63 of the gear 64 to engage with the teeth 62 of the rotor 61. As the drum 68' moves forwardly, the ring 90 forming a part thereof and which carries pins 93, is moved so that the pins engage over the edge 84 of drum 83 being held in engaging relation therewith by the action of arms 91 which are swung outwardly by centrifugal force. When the speed of the drive shaft 5 is increased, the increase in the speed of gear 51 will cause connection to be established between the gear 51 and core 53 of the over-running clutch fixed on sleeve 23, and power is transmitted through rotor 61, gear 64 and drum 68' to the driven wheel 71 and hence to the driven shaft. The mechanism is now in second or intermediate speed.

A shifting plate 99 is slidably supported beneath the cover 100 of the housing 7 by the bolt 101 which extends through the longitudinal slot 102 in the plate. A yoke 103 depends from the end of the plate 99 adapted to engage the rear face of the disk 88 and a second yoke 104 depending from the plate is adapted to engage the forward face of the disk 40. A third yoke 105 is disposed in the groove 106 surrounding the collar 36 and depends from a separate slide plate 107 disposed beneath the plate 99. A button 108 extending upwardly from one end of the rocker arm 109 is disposed in the slots 110 and 111 of the shifting plate 99 and slide plate 107. The rocker arm 109 is fixedly attached to the lower end of the stem 112 which is rotatably mounted in the bearing 113 extending through the cover 100 and a lever 114 is attached to the upper end of the stem. The free end of lever 114 is connected to the arm 115 attached to the shaft 116, by the rod 117, and the shaft 116 extends in parallel relation to the steering column 118, being journaled in suitable bearings 119 and attached to its upper end beneath the steering wheel 120 is a hand lever 121, by means of which the shaft is turned. A clutch yoke 122 extends beneath the shaft 8 having bearings 123 at its ends which are journaled in the sides of the housing 7. The yoke carries rollers 124 at opposite sides adapted to be moved into engagement with the disk 40 and one of the bearings of the yoke extends through the housing and has an arm 125 attached thereto which through the rod 126 has connection with the lower end of the clutch pedal 127, pivotally mounted at 128. The rod 126 is connected to the arm 125 by a slide coupling 129 which permits limited movement of the rod before transmitting movement to the arm. The clutch pedal 127 is mounted adjacent the shaft 130 of the conventional clutch 131 which connects the engine with the transmission and an arm 132 is attached to the shaft 130 which is disposed in the path of movement of the lower end of the clutch pedal. An adjusting screw 133 is mounted in the free end of arm 132 and is engaged by the lower end of the clutch pedal, when the pedal is depressed, thus causing the clutch 131 to be actuated. The free end of the rocker arm 109 has a lug 134 depending therefrom which engages in the slot 135 in the end of the shift rod 136 extending longitudinally of one side of the housing. An arm 137 extends down from the opposite end of the shift rod adjacent the side wall of the housing having a yoke 138 extending laterally from its lower end which is engaged with the clutch collar 139 slidably mounted on the counter shaft 13 by the splines 140, between the gear wheels 68 and 87. The collar 139 is provided on opposite sides with jaws 141 and 142 adapted for interlocking engagement with jaws provided on the gear wheels 68 and 87 thereby establishing connection between the gear wheels and counter shaft. The shift rod 136 adjacent the slot 135 has a pocket 143 contiguous with the slot in which the lug 134 is moved after the rocker arm 109 has moved the full distance to obtain a direct positive speed between the drive and driven shaft.

Figures 1, 27, 28, 29:
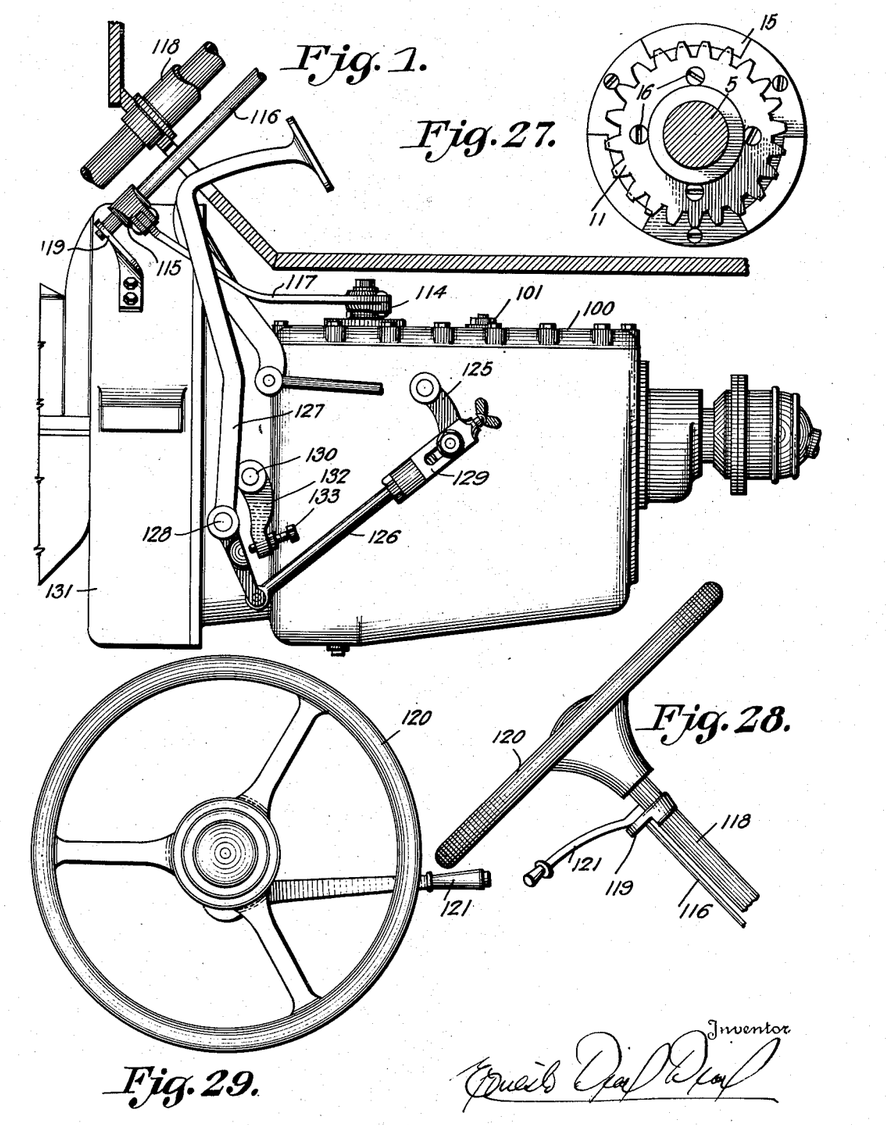
Figures 2, 15, 16, 17:
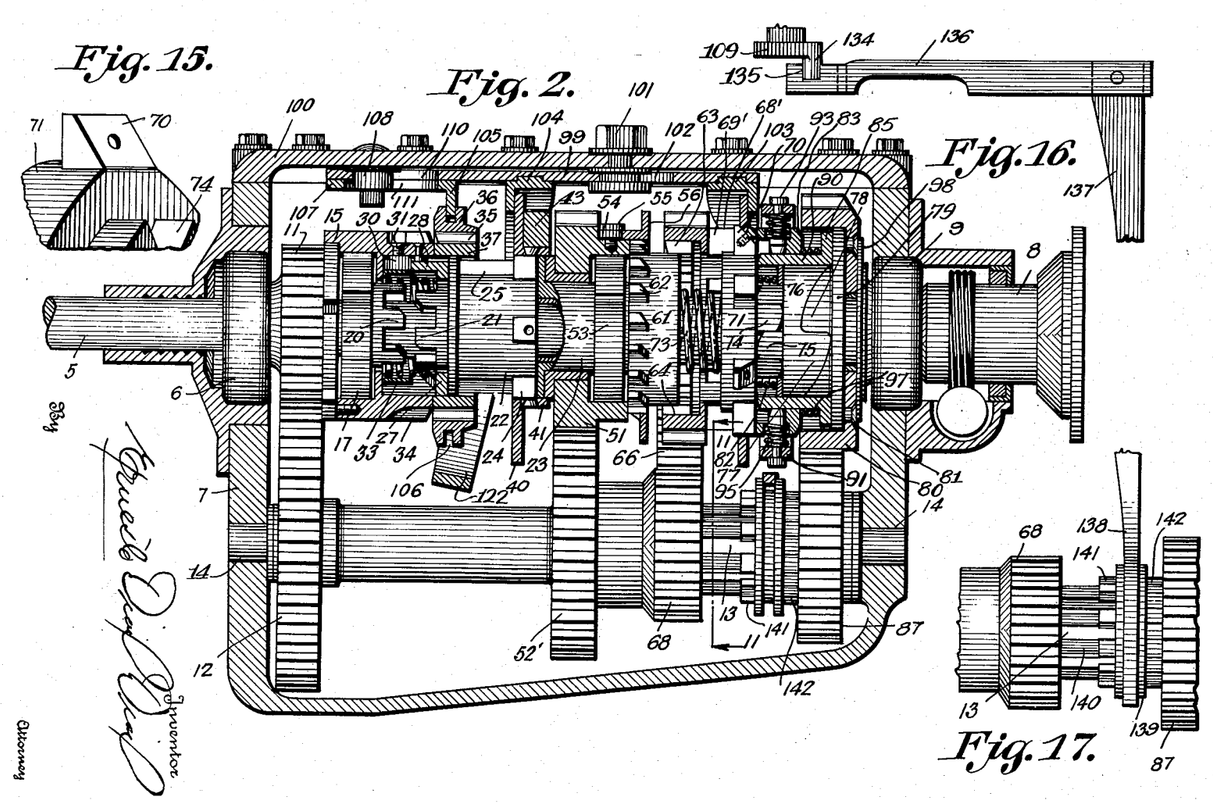
Fig. 2 is a longitudinal section, showing the transmission in low speed gear.
Fig. 15 is a detail perspective view of wheel 71.
Fig. 16 is a side elevation of the shifting rod.
Fig. 17 is a detail side view of the clutch collar, controlled by the shifting rod shown in Fig. 16.
Figures 3, 4, 26:
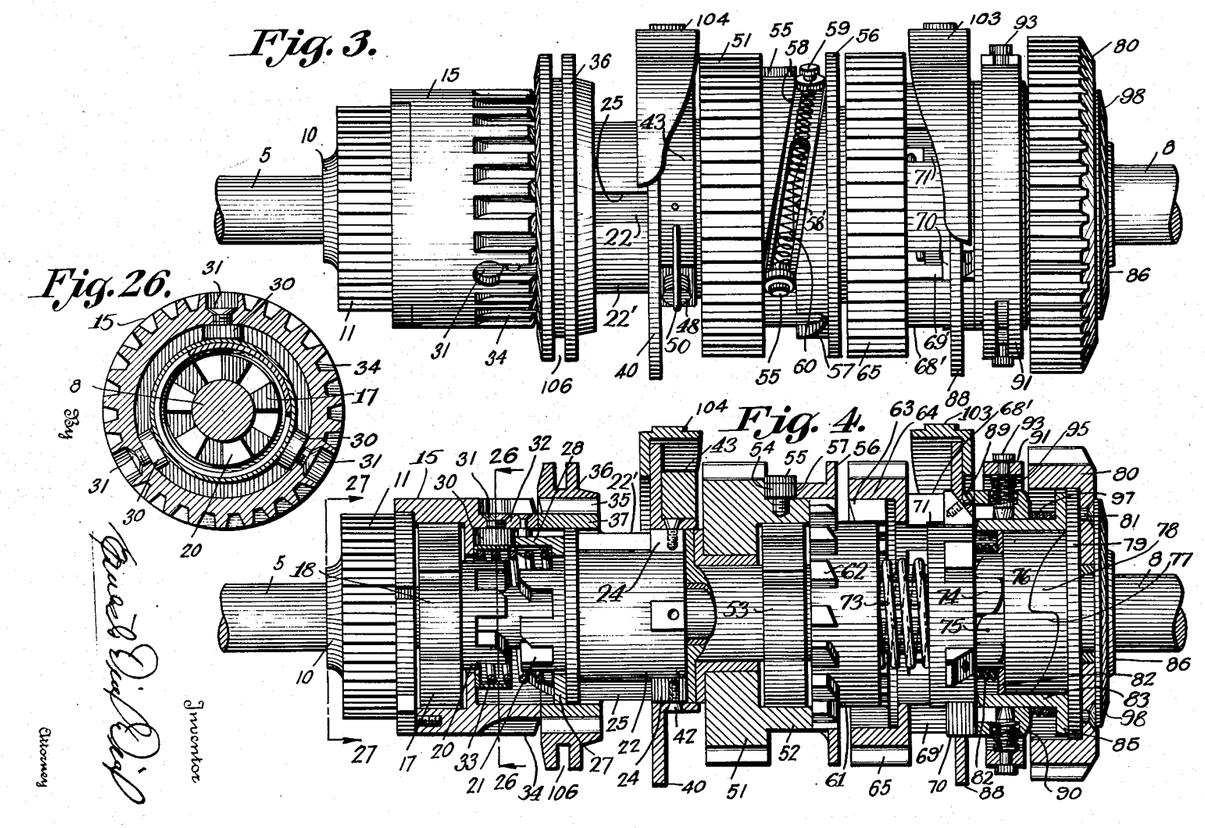
Fig. 3 is a side elevation view of the transmission mechanism.
Fig. 4 is an enlarged longitudinal sectional view.
Fig. 26 is a cross section taken on line 26—26 of Fig. 4.
Figures 5, 13, 18, 19:
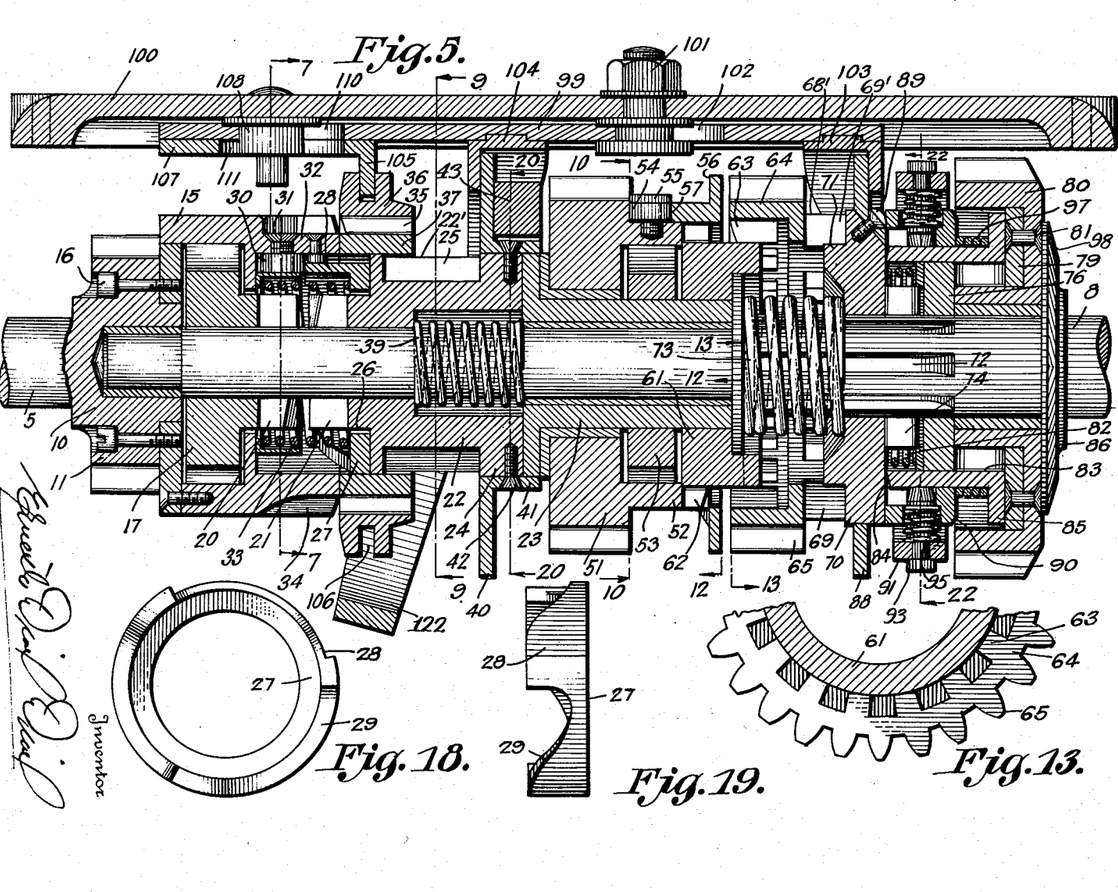
Fig. 5 is an enlarged longitudinal sectional view taken on a different plane.
Fig. 13 is a section taken on line 13—13 of Fig. 5.
Fig. 18 is a front elevation of one of the clutch members.
Fig. 19 is a side view of the clutch member.
Figure 6:
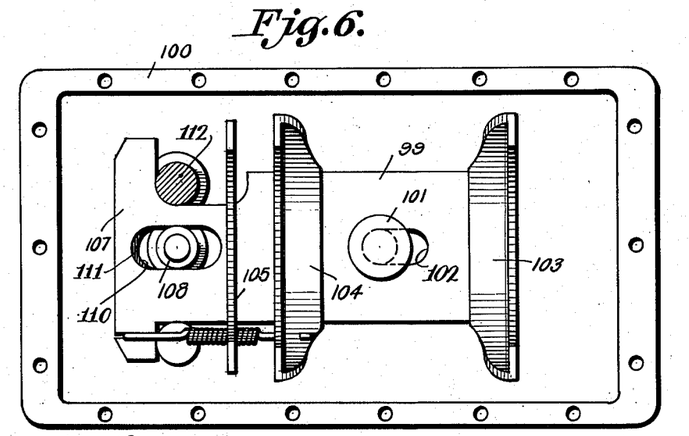
Fig. 6 is a bottom view of the housing cover showing the shifting plates.
Figure 7:
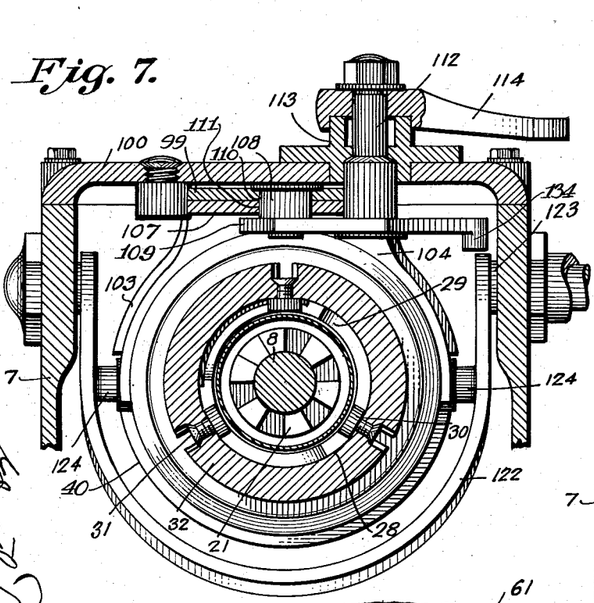
Fig. 7 is a cross section taken on line 7—7 of Fig. 5.
Figure 8:
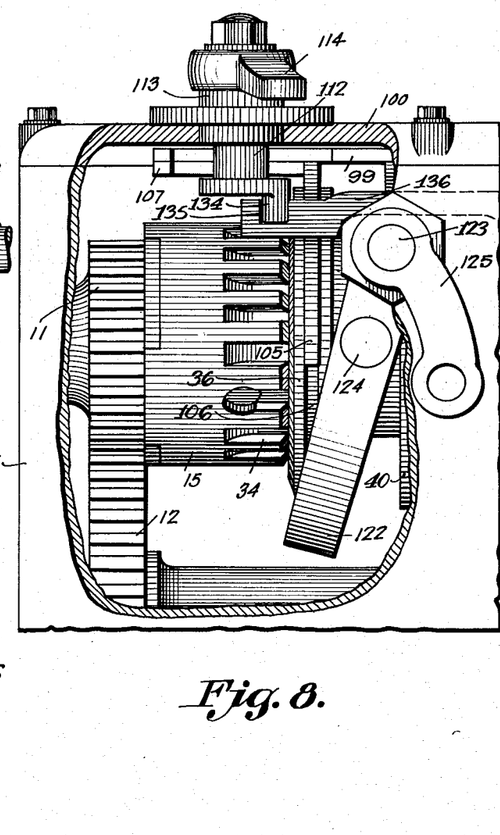
Fig. 8 is a fragmentary side view, with the housing broken away.
Figures 9, 14:
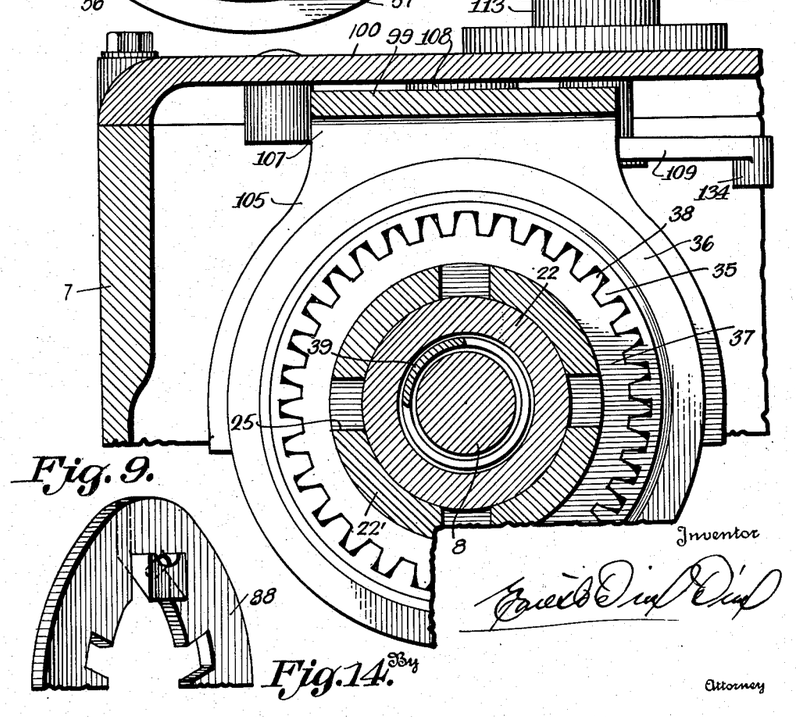
Fig. 9 is a cross section taken on line 9—9 of Fig. 5.
Fig. 14 is a fragmentary perspective view of the disk 88.
Figures 10, 11:
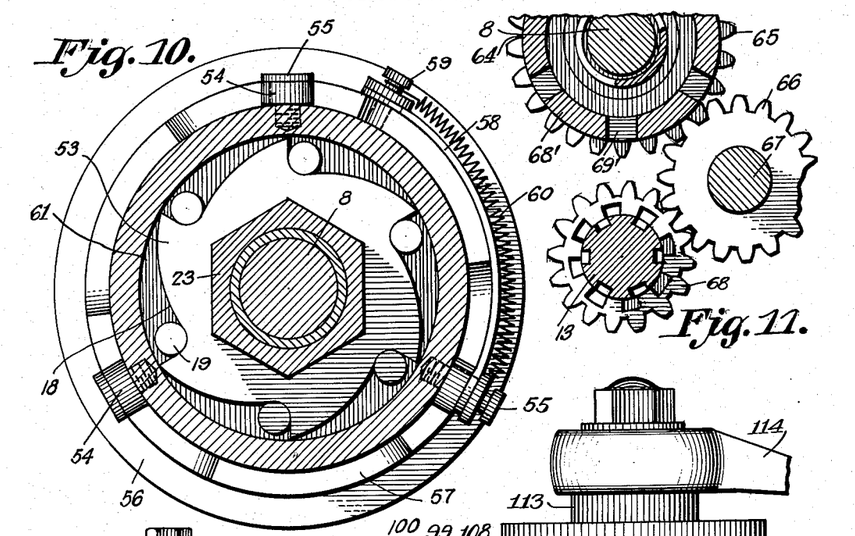
Fig. 10 is a cross section taken on line 10—10 of Fig. 5.
Fig. 11 is a cross section taken on line 11—11 of Fig. 2.
Figure 12:
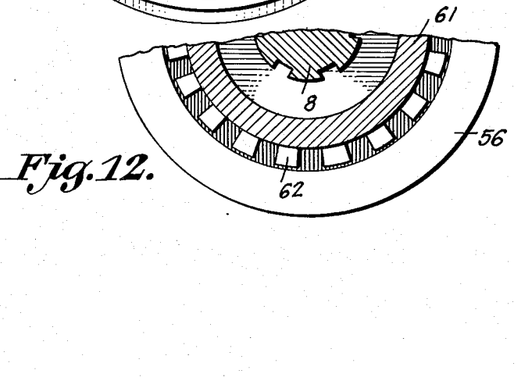
Fig. 12 is a section taken on line 12—12 of Fig. 5.

In operation, with the engine of the vehicle running the operator first depresses the clutch pedal 127 sufficiently to actuate arm 132 to disengage the engine clutch 131. Then the hand lever 121 is moved upward which turns the shaft 116, moving the rod 117 to push the lever 114 backward, thereby rocking the rocker arm 109, which slides the shift rod 136 backward, so that the yoke 138 moves the clutch collar on the counter shaft 13, to cause the jaws 142 to engage the jaws on the gear wheel 87. The expansion of spring 73 will hold the jaws 74, of wheel 71 interlocked with the jaws 75 of the clutch member 76 and the spiral jaw face 77 of the clutch member 76 interlocked with the spiral jaw face 78 of the cooperating clutch member 79 which is securely fastened to the low speed gear 80. The other parts will be in the position shown in Fig. 2. Upon release of the clutch pedal the power of the engine will be transmitted through drive gear 11, gear wheel 12 and countershaft 13 to the clutch collar 139, which transmits movement to gear wheel 87 in mesh with the low speed gear 80. The power of gear 80 is transmitted through the clutch members 76 and 79 and the jaws 74 and 75 to the drive wheel 71, which is splined on the driven shaft 8. The transmission is now in low speed gear and to shift to intermediate speed it is not necessary to depress the clutch pedal.

When it is desired to shift to intermediate speed the speed of the engine is reduced by closing the throttle, which consequently reduces the speed of all parts directly connected to the engine which includes gear 52' and gear 51. The natural forward motion of the vehicle causes the driven shaft 8 to continue rotating at approximately the same speed, it was traveling before the engine was throttled down. This difference of speed between the shaft 8 and parts directly connected with the engine, causes a separation of the spiral clutch faces 77 and 78, alternately moving wheel 71 longitudinally of the shaft 8 and compressing spring 73. When the spring 73 compresses and drive wheel 71 is moved forwardly by the action of clutch member 76, the jaws 70 of the drive wheel move forwardly in slots 69', allowing spring 97 to distend and move the ring 90, drum 68' and gear 64 forwardly, the gear 64 being retarded in its movement by ring 56, until the speed of gear 51 has reduced sufficiently to permit gear 64 to rotate ring 56, by means of frictional contact, so that the rollers 54 engage in the innermost part of the cam surfaces 57. When the gear 64 moves sufficiently to cause the teeth 62 and 63 to interlock, the drum 68' and ring 90 has moved forward sufficiently to permit pins 93 carried by ring 90, which are depressed by the centrifugal action of the arms 91, to engage over the beveled edge 84 of the drum 83 which maintains the jaws 74 and 75, out of engagement, disconnecting the clutch members 76 and 79 from connection with the driven shaft 8. Thus, it is seen that by simply throttling down the engine, the transmission gearing is automatically shifted from low speed to intermediate speed. When in intermediate speed upon increase of the speed of the engine power is transmitted from engine shaft 5 to gear wheel 11, through gear 12, counter-shaft 13 and gear wheel 52' to intermediate speed gear 51. The gear 51 is connected with the sleeve 23 through the over-running clutch 53 and rotor 61, through the meshing of teeth 62 with teeth 63, connects the rotor with the gear 64 and the drum 68' through its connection with the wheel 71 transmits power to driven shaft 8.

To shift to high speed, from intermediate speed, the speed of the engine is throttled down reducing the speed of the clutch casing 15 and spring 39 pushes drum 22 forward causing the shoulder 26, through frictional contact with ring 27, to turn the ring 27, so that the rollers 30 are moved into the deep part of cam surfaces 29 thus allowing jaws 21 and 20 to interlock thereby rotating the core 17 of the over-running clutch 15, so that connection is established between the core and outer casing of the clutch. When the throttle is opened the power of the engine is transmitted from shaft 5 to shaft 8 through 15, 17, 20, 21, 22, 23, 61, 64, and 71. At this speed the over-running clutches permit free wheeling of the driven shaft if it attains a speed greater than the drive shaft. As the gears are always in mesh, it is possible to shift from high to intermediate speed, no matter how fast the vehicle is traveling, simply by depressing the clutch pedal and opening the throttle to increase the speed of the engine and then releasing the clutch pedal again. Only this operation will make the change from high to intermediate speed. By depressing clutch pedal 127 the rod 126 actuates lever 125, to swing the yoke 122, so that its rollers 124 contact disk 40 and move drum 22 to disconnect the jaws 21 and 20. In releasing clutch pedal, the engine through clutch 131 will first be connected with shaft 5, and when the clutch pedal is fully released the disk 40 will be released, but drum 22 cannot move forward because of ring 27.

To obtain a direct positive speed drive, the hand lever 121 is moved to swing the lever 114 backward, which rocks the rocker arm 108 and moves the button 108 forward in the slots 110 and 111 of the shifting plate 99 and slide plate 107, which moves the shifting plate 99, and slide plate 107 causing yoke 105 to move collar 36 so that teeth 35 mesh with teeth 34 establishing driving connection between 15 and 22; also yoke 103 will move wheel 71 forward compressing spring 73 and allowing spring 97 to expand pushing gear 64 so that its interior teeth 63 mesh with teeth 62 of rotor 61. This speed is conventional and can be obtained at anytime, simply by depressing clutch pedal and turning hand lever 121 to the position stated.

To shift to reverse, the hand lever 121 is moved to rock the rocker arm 109, so as to pull the shift rod 136 forward which actuates yoke 138 to move clutch collar 139 so that jaws 141 are engaged with the reverse speed gear 80.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A gear transmission of the class described comprising a power shaft, a driven shaft, a plurality of gears loosely mounted on said driven shaft, a supplemental shaft having connection with said power shaft, a plurality of gears fixedly mounted on said supplemental shaft in constant mesh with said gears on the driven shaft, a drive wheel splined on said driven shaft, a claw clutch normally connecting one of said gears on the driven shaft with said drive wheel and means for connecting said other gears on the driven shaft with said drive wheel including over-running clutches operable upon variation in the speed between said power and driven shaft.

2. A gear transmission of the class described comprising a power shaft, a driven shaft, a plurality of gears loosely mounted on said driven shaft, a supplemental shaft having connection with said power shaft, a plurality of gears fixedly mounted on said supplemental shaft, in constant mesh with said gears on the driven shaft, a drive wheel splined on said driven shaft and movable longitudinally thereof, a claw clutch having one member fixedly attached to one of said gears on the driven shaft and its other member slidably mounted on said driven shaft, means separably connecting said slidable member of the claw clutch with said drive wheel, means for holding said drive wheel disconnected from said claw clutch, an over-running clutch associated with another of the gears on said driven shaft having a rotor and rollers for establishing connection between said gear and rotor and means for establishing connection between said rotor of said over-running clutch and said drive wheel when the drive wheel is moved forwardly by the separation of the claw clutch.

3. A gear transmission of the character described comprising a power shaft, a driven shaft, low speed, intermediate speed and high speed gears loosely mounted on said driven shaft, said high speed gear being directly connected to said power shaft, a supplemental shaft having connection with said power shaft, a plurality of gears fixedly mounted on said supplemental shaft in constant mesh with said low speed and intermediate speed gears, a drive wheel splined on said driven shaft and movable longitudinally thereof, a claw clutch having one member fixedly attached to said low speed gear and its other member slidably mounted on said driven shaft, means separably connecting said slidable member of the claw clutch with said drive wheel, means for holding said drive wheel disconnected from said claw clutch, a sleeve rotatably mounted on said driven shaft intermediate said drive wheel and high speed gear, an over-running clutch associated with said high speed gear unit including a rotor fixed on said sleeve and rollers establishing connection between said gear and rotor, a drum mounted on said driven shaft slidably connected with said sleeve, means for establishing connection between said rotor and drum when said drum is moved forwardly, a spring mounted on said driven shaft within said drum for moving said drum forwardly, releasable means for holding said drum retracted and said spring compressed, and means for establishing connection between said sleeve and said drive wheel when said drive wheel is moved forwardly by the separation of the jaw clutch.

4. A gear transmission of the character described comprising a power shaft, a driven shaft, low speed, intermediate speed and high speed gears loosely mounted on said driven shaft, said high speed gear being directly connected to said power shaft, a supplemental shaft having connection with said power shaft, a plurality of gears fixedly mounted on said supplemental shaft in constant mesh with said low speed and intermediate speed gears, a drive wheel splined on said driven shaft and movable longitudinally thereof, a claw clutch having one member fixedly attached to said low speed gear and its other member slidably mounted on said driven shaft, means separably connecting said slidable member of the claw clutch with said drive wheel, means for holding said drive wheel disconnected from said claw clutch, a sleeve rotatably mounted on said driven shaft and extending through said intermediate speed gear, an over-running clutch establishing connection between said intermediate speed gear and said sleeve, means for establishing connection between said sleeve and said drive wheel when said drive wheel is moved forwardly by the separation of the jaw clutch, a drum rotatably mounted on said driven shaft and slidably connected with said sleeve, means for moving said drum forwardly a second over-running clutch associated with said high speed gear, and means establishing connection between the rotor of said second clutch and said drum when said drum is moved forwardly.

5. A gear transmission of the character described comprising a power shaft, a driven shaft, low speed, intermediate speed and high speed gears loosely mounted on said driven shaft, said high speed gear being directly connected to said power shaft, a supplemental shaft having connection with said power shaft, gears mounted on said supplemental shaft in constant mesh with the low speed and intermediate speed gears, a drive wheel splined on said driven shaft and movable longitudinally thereof, a claw clutch having one member fixedly attached to said low speed gear and its other member slidably mounted on said driven shaft, means separably connecting said slidable member of the claw clutch with said drive wheel, speed responsive actuated means for holding said drive wheel disconnected from said claw clutch, over-running clutches associated with said intermediate speed and high speed gears, means operable by the forward movement of said drive wheel to establish connection between said drive wheel and the clutch of said intermediate speed gear and spring operated means for establishing connection between the clutch of said high speed gear and said drive wheel.

6. A gear transmission of the character described comprising a power shaft, a driven shaft, low speed, intermediate speed and high speed gears loosely mounted on said driven shaft, said high speed gear being directly connected to said power shaft, a supplemental shaft having connection with said power shaft, gears mounted on said supplemental shaft in constant mesh with said low speed and intermediate speed gears, a drive wheel splined on said driven shaft intermediate said low and intermediate speed gear, said wheel being movable longitudinally of said shaft, a claw clutch having one member fixedly attached to said low speed gear and its other member slidably mounted on said driven shaft, means separably connecting the sliding member of said clutch with said drive wheel, a reverse gear wheel disposed on said driven shaft intermediate said drive wheel and intermediate speed gear, said reverse gear having internal clutch teeth, means slidably connecting said reverse gear and drive wheel together, a sleeve rotatably mounted on said driven shaft and extending through said intermediate speed gear, a rotor mounted on said sleeve having external teeth adapted to engage the internal teeth of said reverse gear when said gear is moved forward by said drive wheel, means for holding said drive wheel disconnected from said claw clutch and in a forward position, an over-running clutch for establishing connection between said intermediate speed gear and said sleeve, a drum rotatably mounted on said driven shaft, between said high speed and intermediate speed gears, said drum being disposed within the forward end of said sleeve and slidably connected therewith, a second over-running clutch associated with said high speed gear, means establishing connection between the rotor of said second over-running clutch and said drum when said drum is moved forwardly, speed responsive means for holding said drum retracted and spring means for moving said drum forwardly when released.

7. A gear transmission of the class described comprising a drive shaft, a driven shaft, a low speed driving gear, and second speed driving gear loosely mounted on said driven shaft and a high speed driving gear fixedly mounted on said drive shaft, a counter shaft driven by said drive shaft, gears on said counter shaft in constant mesh with said driving gears, a drive wheel slidably keyed on said driven shaft intermediate said low and second speed gears, a jaw clutch normally connecting said low speed gear and drive wheel together adapted to be disengaged upon a reduction in speed of the drive shaft, means for connecting said second speed gear with said drive wheel including an over-running clutch, said means being actuated by said drive wheel to establish connection between said second speed gear and drive wheel when said jaw clutch is disengaged and the speed of the drive shaft is increased, means for establishing connection between said high speed gear and said drive wheel, including an over-running clutch and speed responsive means for controlling said last mentioned means.

8. A transmission mechanism comprising a drive shaft, a driven shaft having a series of gears loosely mounted thereon, a counter shaft driven by said drive shaft having a plurality of gears in constant mesh with the gears on said driven shaft, a claw clutch operative in one direction only, mounted on said driven shaft having one member attached to one of the gears on said driven shaft and its other member mounted for sliding movement on said shaft, a drive wheel splined on said driven shaft adjacent said clutch having separable connection with the sliding member of said clutch, a drum surrounding and rotatable by said driven wheel adapted to be moved forwardly by said drive wheel when said drive wheel is moved by the separation of said jaw clutch, centrifugal actuated locking pins carried by said drum for holding said drive wheel in its forward position and disconnected from said clutch, a sleeve rotatably mounted on the driven shaft, forwardly of said drive wheel, said sleeve extending through another of said gears on said driven shaft, a rotor fixed on said sleeve between said gear and drum, said drum and rotor having interfitting teeth for connecting said drum and rotor in driving relation when said drum is moved forward, an over-running clutch mounted on said driven shaft between said second mentioned gear and rotor having a core fixed on said sleeve and rollers for establishing connection between said core and gear, and speed responsive means between said second gear and drum normally retaining said drum out of engaging relation with said rotor, said means being operable to release said drum when the speed of said second gear is less then the speed of said drum.

9. In an automatic constant mesh transmission gearing having a driving shaft, a driven shaft in alignment therewith and a parallel counter-shaft and in which gear wheels fixed on the driving and counter shaft mesh with normally free gears on the driven shaft, a drive wheel splined on said driven shaft intermediate the gears thereon, a jaw clutch for connecting said drive wheel with one of said gears on the driven shaft, including a fixed member attached to the gear and a movable member slidable on said shaft, said clutch being operable in one direction only and adapted to separate upon a change in the speed between said gear and driven shaft, a drum surrounding said drive wheel having driving connection therewith, centrifugal actuated pins carried by said drum for holding said drum and drive wheel in a forward position when moved by the action of said clutch, a sleeve rotatably mounted on said driven shaft on which is journaled another of the gears on said driven shaft, a rotor fixed on said sleeve, said rotor and drum having interfitting teeth for establishing connection between said drum and rotor upon forward movement of the drum, an over-running clutch for connecting said second gear to said sleeve including a core fixed on said sleeve and rollers for connecting the core with the gear, speed responsive means between said second gear and drum normally retaining said drum and rotor in separate relation, but operable to release said drum upon a change in speed between said second gear and drum, a second drum slidably mounted on said driven shaft within the forward end of said sleeve and connected with said sleeve for rotation therewith, centrifugal actuated locking pins for locking said second drum and sleeve together, an over-running clutch having its casing connected with said drive shaft and its core loosely mounted on said driven shaft with rollers for connecting the core and casing together, spring means for moving said second drum forward when released, jaws for connecting said drum and clutch core together, when said drum moves forward, and speed responsive means normally retaining said second drum and clutch core in separate relation and operable to release said drum when the speed of said drive and driven shafts varies.

10. In a constant mesh transmission gearing having a drive shaft, a driven shaft aligned with said drive shaft having low speed, intermediate speed and high speed gears loosely mounted thereon, said high speed gear being fixed to said drive shaft, a counter shaft parallel to said drive and driven shafts having gear wheels in constant mesh with said gears on said driven shaft, a drive wheel splined on said driven shaft, and capable of longitudinal movement, a claw clutch operative in one direction only for establishing connection between said low speed gear and said drive wheel including a member movable longitudinally of said driven shaft to move said drive wheel forward when the clutch is disengaged, said clutch being disengaged when the speed of said low speed gear is less then the speed of said drive wheel, a sleeve rotatable on said driven shaft forward of said drive wheel forming a bearing for said intermediate speed gear, a rotor for driving said sleeve, means rotated by said drive wheel and movable by said drive wheel longitudinally of said driven shaft to establish driving connection between said rotor and said driven wheel, an over-running clutch for connecting said intermediate speed gear with said sleeve, means rotated by said sleeve and movable longitudinally of said driven shaft, centrifugal actuated means for holding said last mentioned means against longitudinal movement, spring means for moving said last mentioned means longitudinally of said shaft when released and an over-running clutch for establishing connection between said last mentioned means and said high speed gear, when said means is moved forward.

11. A gear transmission of the class described comprising a power shaft, a driven shaft, a plurality of gears loosely mounted on said driven shaft, a supplemental shaft driven by said power shaft having a plurality of gears thereon in constant mesh with said gears on said driven shaft, a drive wheel splined on said driven shaft, a clutch normally connecting one of said gears on the driven shaft with said drive wheel, means for connecting the other gears on said driven shaft with said drive wheel including over-running clutches operable upon variation in the speed between said power and driven shafts and centrifugal weight actuated means for controlling the engagement and dis-engagement of said clutches.

12. In a constant mesh transmission gearing having a power shaft, a driven shaft having a plurality of gears loosely mounted thereon, a counter shaft driven by said power shaft having a plurality of gears in constant mesh with the gears on said driven shaft, a drive wheel splined on said driven shaft, means for connecting the gears on said driven shaft with said drive wheel including over-running clutches operable upon variation in the speed between said power and driven shafts.

13. In a constant mesh transmission gearing having a power shaft, a driven shaft having a plurality of gears loosely mounted thereon, a counter shaft driven by said power shaft having a plurality of gears in constant mesh with the gears of said driven shaft, a drive wheel splined on said driven shaft and slidable longitudinally thereof, a jaw clutch normally establishing connection between said drive wheel and one of the gears on said driven shaft, having one of its jaw faces fixedly connected to the gear and its other jaw face slidable longitudinally of the driven shaft and separably connected to the drive wheel, said slidable jaw face being disengaged from the fixed jaw face upon a reduction in the speed of the drive shaft and moved axially of the driven shaft to slide said drive wheel and means for connecting the other gears on said driven shaft with said drive wheel upon sliding of said drive wheel; including over-running clutches operable upon variation in the speed between said power and driven shafts.

14. In a constant mesh transmission gearing having a power shaft, a driven shaft having a plurality of gears loosely mounted thereon, a counter shaft driven by said power shaft having a plurality of gear wheels thereon in constant mesh with the gears on the driven shaft, a drive wheel splined on said driven shaft and slidable longitudinally thereof, a jaw clutch mounted on said driven shaft between said drive wheel and one of said gears on said driven shaft having one of its jaw faces fixedly connected to the gear and its other jaw face slidable longitudinally of the driven shaft and separably connected with the drive wheel, said slidable jaw face being disengaged from the fixed jaw face upon reduction in speed of the drive shaft whereby said drive wheel is moved longitudinally of the driven shaft, means including an over-running clutch for connecting another of said gears on said driven shaft with said drive wheel when said drive wheel is moved longitudinally of the driven shaft by the disengagement of said jaw clutch and the speed of the drive shaft is increased, means for connecting another of said gears on the driven shaft with said drive wheel including an over-running clutch and speed responsive means for controlling said last mentioned means.

ERNESTO DIAZ DIAZ.